Jan. 15, 1935.   C. LE G. FORTESCUE   1,987,736
REGULATING SYSTEM
Filed Dec. 21, 1932   2 Sheets-Sheet 1

WITNESSES:

INVENTOR
Charles Le G. Fortescue.
BY
ATTORNEY

Jan. 15, 1935.　　C. LE G. FORTESCUE　　1,987,736
REGULATING SYSTEM
Filed Dec. 21, 1932　　2 Sheets-Sheet 2

WITNESSES:

INVENTOR
Charles LeG. Fortescue.
BY
ATTORNEY

UNITED STATES PATENT OFFICE 1,987,736

REGULATING SYSTEM

Charles Le G. Fortescue, Pittsburgh, Pa., assignor to Westinghouse Electric & Manufacturing Company, East Pittsburgh, Pa., a corporation of Pennsylvania Application December 21, 1932, Serial No. 648,200

9 Claims. (Cl. 171—119)

My invention relates to regulating apparatus for alternating-current machines and particularly to voltage regulators for synchronous generators and similar machines.

In the usual forms of voltage regulators for synchronous machines, a voltage responsive element of some form is provided for detecting variations of a voltage condition of the machine, and a corrective action is applied to the machine by raising or lowering its excitation in response to operation of the voltage-responsive element. A certain time lag is inherent in such an arrangement because of the fact that the voltage change of the machine is not instantaneous but involves a change of stored magnetic energy in a magnetic circuit of the machine or of kinetic energy stored in the rotor, depending upon the component of voltage considered.

It is an object of my invention to provide a novel regulating system for alternating-current machines in which a corrective action is initiated before a change of voltage is completed, in response to an effect which, if uncorrected, would ultimately bring about the voltage change. More specifically, it is an object of my invention to provide means for varying the excitation of the machine in response to current changes in such manner as to anticipate or prevent the changes of voltage which would otherwise be brought about by the current changes.

Another object of my invention is to provide a novel regulating system of the type indicated above, which shall provide high-speed compensation for the field distortion effects occasioned by armature reaction in the regulated machine.

Other objects of my invention will become evident from the following detailed description taken in conjunction with the accompanying drawings, in which.

Figure 1:
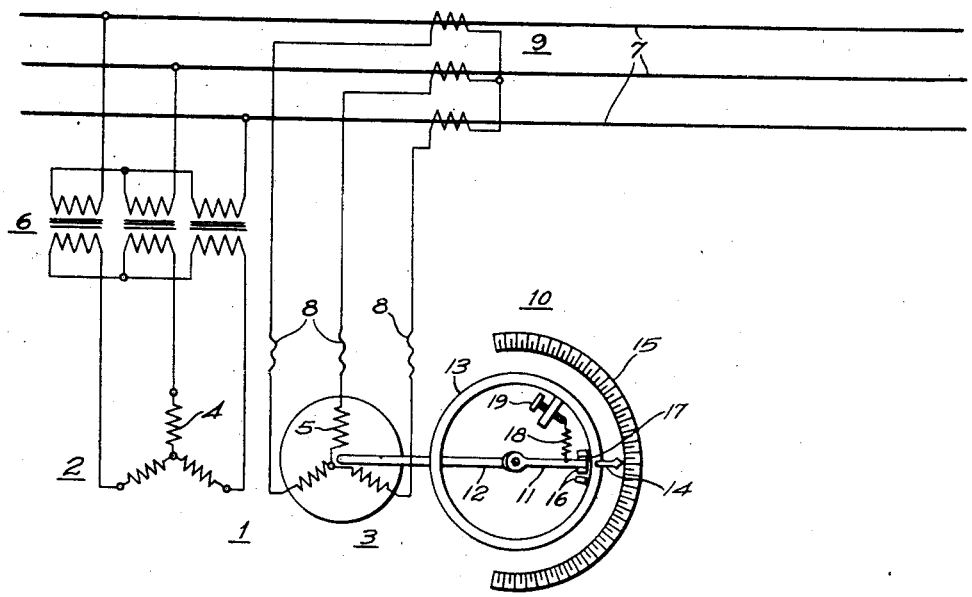
Figure 1 is a diagrammatic view of a relay used in the practice of my invention.

Referring to Fig. 1 in detail, the relay 1 comprises a stator 2 of the type usually provided in rotating field apparatus and a rotor 3 of the type provided in wound-rotor induction motors. As the construction of these elements is well known in the art, the mechanical details thereof have not been shown.

The stator 2 is provided with a polyphase stator winding 4 for producing a rotating field of any even number of poles, and the rotor 3 is provided with a polyphase rotor winding 5 of the same pole pitch as the stator winding 4. For purposes of illustration it will be assumed that the stator winding 4 and rotor winding 5 are two pole windings, although the actual number of poles may be two or any multiple thereof.

The stator winding 4 is connected by means of a bank of voltage transformers 6 to be energized in accordance with the voltage of a polyphase power circuit 7. The rotor winding 5 is connected by means of flexible conductors 8 to a bank of current transformers 9 to be energized in accordance with the phase currents of the power circuit 7. The connections of the windings 4 and 5 are of such relative phase sequence that the magnetic fields produced by the stator 2 and the rotor 3 rotate in the same direction.

The rotor 3 is mechanically connected to a contact mechanism, of any suitable type, indicated diagrammatically at 10. The contact mechanism illustrated comprises a contact arm 11 secured by means of a shaft 12 to the rotor 3 to be operated thereby, and a supporting ring 13 secured by any suitable means (not shown) so that it may be rotated about its center in the plane traversed by the contact arm 11 and may be frictionally held in any angular position to which it is adjusted. A pointer 14 secured to the supporting ring 13, and a stationary arcuate index 15 are provided for indicating the angular position of the supporting ring 13. A normally open set of contact members 16 and a normally closed set of contact members 17 are controlled by the contact arm 11. A biasing spring 18 is provided for resiliently holding the contact arm 11 in the position in which the contact members 17 are closed, and any suitable adjusting mechanism 19 is provided for adjusting the biasing torque produced by the spring 18.

The operation of the above described apparatus may be set forth as follows. Assuming that the circuit 7 is energized by balanced three-phase voltage and carries balanced three-phase current, the stator winding 4 draws an exciting current proportional to the voltage of the circuit 7 and lagging the latter voltage by a phase angle of substantially 90°. The exciting current flowing in the stator winding 4 produces a rotating field in phase with the exciting current.

The current flowing in the rotor winding 5 also produces a rotating field, but as the rotating fields produced by the stator and rotor revolve in the same direction, the rotor 3 does not rotate continously but tends to assume a stable position. The current flowing in the rotor winding 5, which is proportional to and in phase with the current in the power circuit 7, reacts with the stator field to produce a torque. This torque, as in similar rotating field apparatus, is proportional to the vector product of stator field flux and rotor current.

Assuming that the rotor 3 is held in the angular position in which the rotor winding 5 coincides with the stator winding 4, as shown in Fig. 1, the power component of current of the circuit 7 is in quadrature with the stator flux and hence produces no torque. The reactive component of current of the circuit, however, is in phase with the stator flux and produces a torque proportional to the product of reactive current and volage or to the reactive power of the circuit 7.

If the current in the circuit 7 is now brought into phase with the voltage by making the power factor of the circuit unity, the reactive power of the circuit 7 becomes zero and the torque produced by the rotor 3 also becomes zero.

If the rotor 3 is now rotated away from the position shown in Fig. 1, the quadrature space relationship of the stator flux and rotor current is destroyed, and the rotor 3 again produces a torque tending to return the rotor to the position of zero torque. From the above it may be seen that the torque produced by the rotor 3 depends upon both the phase angle of the current of the circuit from which the relay 1 is supplied and the angular position of the rotor 3. Assuming sinusoidal flux distribution in the air gap of relay 1, it may be shown that the rotor torque is proportional to $EI \sin(\alpha - \theta)$ where $E$ is the effective voltage of the power circuit 7,
$I$ is the effective current of the power circuit 7,
$\theta$ is the power-factor angle of the circuit 7 and
$\alpha$ is the angular displacement of the rotor 3 from the position in which the windings 4 and 5 coincide, expressed in electrical degrees.

Figure 2:
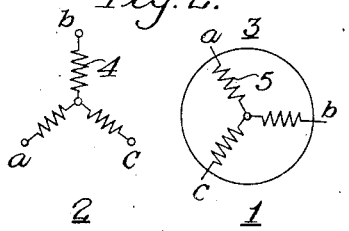
Fig. 2 is a diagrammatic view of the stator and rotor windings of the relay shown in Fig. 1, in a different relative position to that shown in Fig. 1.

If the rotor 3 is rotated through 90 electrical degrees from the position shown in Fig. 1 to the position shown in Fig. 2, while the power factor of the circuit 7 is held at unity, the current in the rotor winding 4 is brought into phase with the stator flux in space position, and the torque produced by the rotor 3 becomes a maximum. If the power factor of the power circuit 7 is now varied from unity, introducing a reactive current component, the reactive current produces no torque as its space position is in quadrature to the space position of the stator flux. The torque produced by the rotor 3 in the position shown in Fig. 2 accordingly is a measure of the real power flow in the circuit. This conclusion may also be reached by substituting 90° for the angle $\alpha$ in the expression given above for rotor torque. The expression then becomes $EI \sin(90° - \theta)$ which reduces to $EI \cos \theta$, the usual alternating-current power product.

If a current of power factor other than unity flows in the power circuit 7 and the rotor 3 is permitted to rotate freely, the rotor 3 turns to a position in which its torque is zero, as a continuous torque would require continuous acceleration or continuous rotation, either of which is impossible because of the relative direction of rotation of the stator and rotor fields. As the factors E and I are fixed externally by the circuit 7, the factor $(\alpha - \theta)$ becomes zero, that is the rotor 3 turns to the position in which the angle $\alpha$ equals the power factor angle $\theta$ of the power circuit 7. In this position the rotor torque is proportional to $EI \sin 0°$ which is equal to zero. If the rotor 3 is now rotated through 90° from the latter zero torque position, a maximum torque position is reached in which the rotor torque is proportional to $EI \sin 90°$ or $EI$, that is to the volt-ampere product of the circuit 7.

It will, therefore, be seen that the operating torque of the relay 1 may be made to depend upon reactive power, real power or volt-amperes, depending upon the angular position in which the rotor 3 is held. For example, if the supporting ring 13 of Fig. 1 is adjusted to the position shown in Fig. 1, and the biasing torque produced by the spring 18 is adjusted to a value corresponding to a predetermined power flow in the circuit 7, the relay 1 will respond to a corresponding value of reactive power. Upon the occurrence of a directional reactive power flow in the circuit 7 in excess of the setting of the relay 1, the torque produced by the rotor 3 becomes greater than the biasing torque of the spring 18, the contact members 17 open, and the contact members 16 close.

In the operation of the apparatus described above, it has been assumed that the polyphase voltage and current of the power circuit 7 are balanced. If an unbalanced condition of both voltage and current exist, both the stator 2 and rotor 3 produce negative phase-sequence flux components, that is flux components which revolve in the direction opposite to normal. These negative phase-sequence flux components interact to produce a torque tending to turn the rotor to a zero torque position determined by the phase angle of negative phase-sequence current as compared with negative phase-sequence voltage. Whether or not it is desirable to suppress the negative phase-sequence torque produced in this way depends upon the impedance relationship of the circuit to which the relay is applied and the degree of unbalance which will probably be encountered. The negative phase sequence torque may be eliminated by suppressing either the negative phase-sequence components of voltage applied to the stator winding 4 or the negative phase-sequence components of current supplied to the rotor winding 5, by means of any suitable phase-balancing apparatus such as a small induction motor.

Figure 3:
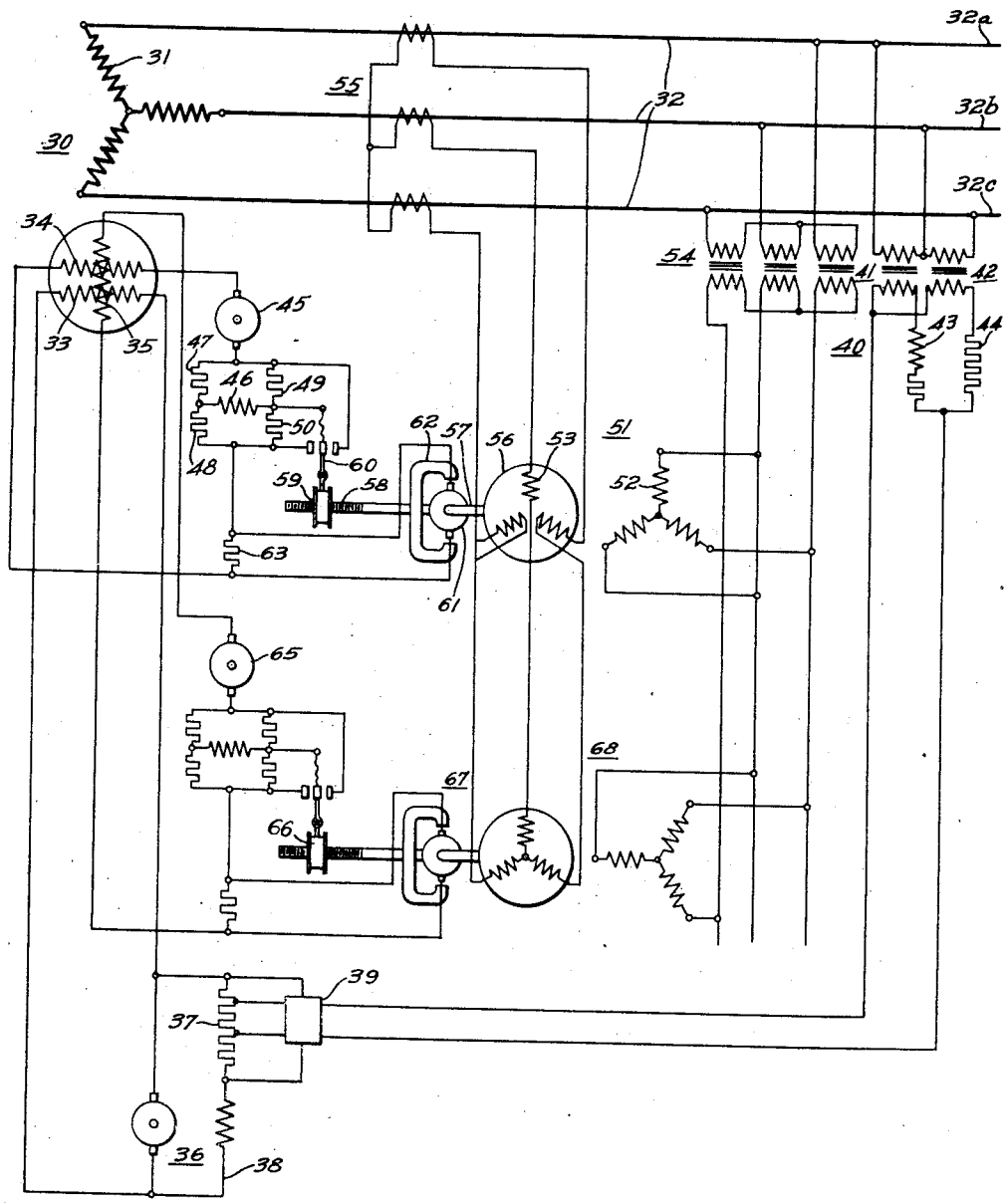
Fig. 3 is a diagrammatic view of a regulating system embodying my invention.

Fig. 3 shows diagrammatically an application of my invention to the control of a polyphase synchronous generator. Referring to Fig. 3 in detail, the stator windings 31 of a polyphase alternating-current generator 30 are connected to a power circuit 32 for supplying power thereto.

The generator 30 is provided with a main field winding 33, an auxiliary field winding 34 mounted upon the generator field magnets concentric to the main field winding 33, and a quadrature auxiliary field winding 35, preferably wound in the pole faces of the generator field magnets and effective to increase the flux in the leading pole tips and decrease the flux in the trailing pole tips or vice versa, without substantial change of the total field flux.

The main field winding 33 of the generator 30 is connected to a shunt wound exciter 36 of the usual type to be energized therefrom. A regulating resistor 37 is included in the shunt field circuit 38 of the exciter 36 and is controlled by means of a regulating device 39 of any suitable type for maintaining a substantially constant voltage at the terminals of the generator 30 or at some point in the circuit 32. Inasmuch as regulating devices suitable for this purpose are well known in the art, the detailed construction of the regulating device 39 is not shown or described. The regulating device 39 is preferably energized by means of a positive phase-sequence voltage network 40, for maintaining the positive symmetrical components of voltage substantially constant at a point which will be assumed as the terminals of the generator 30.

The phase sequence network 40 comprises a pair of voltage transformers 41 and 42, having their primary windings connected to the phase conductors of the circuit 32 in order indicated by the subscripts a, b and c of the conductors 32a, 32b and 32c of the circuit 32. The secondary windings of the transformers 41 and 42 are connected in parallel branch circuits with impedance elements 43 and 44, respectively. The constants of the impedance elements 43 and 44 are so related that the total impedance of the branch circuit which includes the secondary winding of the transformer 41 is equal to the total impedance of the branch circuit which includes the secondary winding of transformer 42, but has a phase angle displaced 60° in the lagging direction from that of the latter impedance.

The auxiliary field winding 34 is connected to a series wound exciter 45 to be energized therefrom. The exciter 45 is preferably of laminated construction to permit easy reversal of its voltage and is provided with a series field winding 46, connected in any suitable manner to permit reversal of the exciter voltage. In the illustrated embodiment of the invention, the field winding 46 is connected in a Wheatstone bridge circuit with a pair of equal resistors 47 and 48 and a second pair of equal resistors 49 and 50.

The total resistance of the circuit of the auxiliary winding 34 is less than the critical resistance of the series exciter 45 for the connections shown, so that if the resistor 49 is short-circuited, the voltage of the exciter 45 will build up to saturation in one direction, or if the resistor 50 is short-circuited, the voltage of the exciter will build up to saturation in the opposite direction.

A relay 51 if the general type described in connection with Figs. 1 and 2 is provided for controlling the excitation of the exciter 45. The relay 51 is provided with polyphase stator windings 52 and rotor windings 53, energized by means of a bank of voltage transformers 54 and a bank of current transformers 55, respectively, as described in connection with Fig. 1.

The rotor 56 of the relay 51 is provided with a shaft 57 having a threaded portion 58 upon which is secured a travelling nut 59. The travelling nut 59 is mechanically connected to contact mechanism 60 for short-circuiting the resistor 49 when the shaft 57 is rotated through a small angle in one direction or for short-circuiting the resistor 50 when the shaft 57 is rotated through a small angle in the opposite direction. When the travelling nut 59 stands in neutral position, as shown in Fig. 3, neither resistor 49 nor 50 is short-circuited.

A direct-current torque device of any suitable type, which is illustrated as a direct-current armature 61, is secured to the shaft 57 for exerting a torque in opposition to the torque of the relay 51. The armature 61 is excited by means of a permanent magnet 62, and is connected to a shunt 63 in the circuit of the auxiliary field winding 34.

The relative position of the travelling nut 59 and the rotor 56 is such that when the travelling nut 59 stands in neutral position, as shown, the rotor winding 53 coincides in angular position with the stator winding 52. It will be recalled from the description of Fig. 1 that when the relay armature is in the latter position, its torque is proportional to the reactive power of the circuit from which the relay is supplied.

The quadrature auxiliary winding 35 of the generator 30 is connected to a series exciter 65 similar to the series exciter 45, and connected in the same manner. Regulating apparatus comprising a travelling nut 66, a direct-current torque device 67 and a relay 68 of the type described above are provided for controlling the excitation of the exciter 65.

The relative position of the travelling nut 66 and the rotor of the relay 68, however, is such that when the travelling nut 66 stands in neutral position, the rotor windings of the relay 68 are in quadrature with the corresponding stator windings. As explained above in connection with Fig. 2, when the relay rotor and stator windings are in quadrature, the relay torque is proportional to the real power flow in the circuit from which the relay is supplied.

The operation of the apparatus shown in Fig. 3 may be set forth as follows: Assuming that the generator 30 and exciters 36, 45 and 65 are being driven at constant speed and that no power is drawn from the circuit 32, the regulating device 39 acts to maintain the positive symmetrical components of generator terminal voltage at a constant value. As the reactive power flow and real power flow in the circuit 32 are zero, the relays 51 and 68 produce no torque. As long as the travelling nuts 59 and 66 stand in neutral positions, the exciters 45 and 65 generate no voltage and the generator excitation is supplied entirely by the main field winding 33.

If, because of a slight disturbance, the travelling nut 59 is moved from neutral position in the direction to cause the short-circuiting of the resistor 49, the voltage of the exciter 45 commences to build up and a current flows in the circuit of the auxiliary field winding 34. Part of this current is shunted through the direct current armature 61, however, and produces a torque tending to return the travelling nut 59 to neutral position. As this torque is unopposed by any torque produced by the relay 51, the travelling nut 59 returns to neutral position removing the short-circuit from the resistor 49 and reducing the excitation of the exciter 45 to zero. If a slight disturbance causes the travelling nut 59 to move in the opposite direction, the resistor 50 is short-circuited and the voltage of the exciter 45 builds up in the opposite direction. This causes a field current to flow momentarily until the reverse torque produced by the armature 61 returns the travelling nut 59 to neutral position. It will be seen therefore, that the travelling nut 59 oscillates back and forth maintaining a current of substantially zero value in the circuit of the auxiliary field winding 34. The travelling nut 66 oscillates in a similar manner, maintaining substantially zero current in the quadrature auxiliary field winding 35.

If the circuit 32 now draws a lagging current from the generator 30, the reactive component of this current flowing in the armature winding 31 of the generator acts in a well known manner to produce a magnetic field tending to de-magnetize the generator. The real component of current in the generator armature windings similarly acts to produce a magnetic field in quadrature to the main field flux, that is, tending to modify the distribution of flux across the generator field pole faces. The aggregate of these effects is termed "armature reaction" and causes a reduction of generator terminal voltage and a phase shift of terminal voltage in the lagging direction from the internal or generated voltage of the generator.

The reactive current flow in the circuit 32, however, sets up a torque in the relay 51, and the exciter 45 now acts to build up the current in the auxiliary field winding 34 to such an average value that the torque produced by the armature 61 equals the torque produced by the relay 51. As the torque of the relay 51 is proportional to reactive power flow in the circuit 32, and the torque of the armature 61 with constant excitation is proportional to the current in the armature 61, which in turn is proportional to the current in the auxiliary field winding 34, it will be seen that a linear relationship is maintained between reactive power flow in the circuit 32 and the current in the field winding 34. The current in the field winding 34 acts to produce a component of generator field flux which raises the total generator excitation a sufficient amount to overcome the demagnetizing effect of armature reaction.

The regulating apparatus associated with the quadrature auxiliary field winding 34 acts in a similar manner to balance the cross component of field flux produced by the real power flow in the circuit 32.

If the load on the generator 30 changes suddenly, the total resulting change of generator voltage does not occur instantaneously because of the time required for readjustment of the stored magnetic energy in the generator magnetic circuit and the stored kinetic energy in the generator armature. The change of current accordingly precedes the change of voltage, as is well known. As the relays 51 and 68 operate upon the occurrence of the current change, whereas the regulating device 39 operates in response to the voltage change, the operation of the former is the more rapid. The initial steps of the regulating operation are accordingly effected at high speed by the relays 51 and 68, and the regulating device 39 operates to maintain accurate voltage regulation of the generator 30 under substantially steady state conditions after the initial field flux change has been brought about by the relays 51 and 68.

As the relays 51 and 68 operate at high speed to compensate for the field distortion produced by armature reaction, there is no shift in the angular position of the generator rotor relative to the synchronous position of the generated voltage upon the occurrence of a change of load. The acceleration or deceleration of the generator rotor to its final angular position, together with the comparatively large power changes resulting from the readjustment of the rotor kinetic energy which occur in uncompensated generators under these conditions, are accordingly substantially avoided. Because of these effects the regulating action of the apparatus described above is much more rapid than that which occurs in a purely voltage-responsive regulating system.

If the power factor angle of current in the circuit 32 shifts from lag to lead, the reactive power flow reverses and the armature reaction of the generator 30 tends to raise the generator terminal voltage. However, the torque produced by the relay 51 also reverses, causing the voltage of the exciter 45 and the current in the auxiliary field winding 34 to reverse. The current in the field winding 34 is maintained at a value proportional to the leading reactive power in the circuit 32 and reduces the total generator excitation a sufficient amount to compensate for the magnetizing effect of armature reaction.

Similarly, if the direction of real power flow in the circuit 32 reverses and the generator 30 runs as a synchronous motor, the torque produced by the relay 68 reverses and a cross field is produced by the quadrature auxiliary winding 35 of sufficient value to neutralize the cross-component of armature reaction in the generator 30.

Although I have described my invention in connection with regulation to compensate for armature reaction of generators it will be obvious that the invention is applicable to other regulating purposes for the same or other types of machinery. It will also be obvious that devices within the scope of the invention are capable of general application in connection with polyphase apparatus, independently of the regulating art.

I do not intend that the present invention shall be restricted to the specific structural details, arrangement of parts or circuit connections herein set forth, as various modifications thereof may be effected without departing from the spirit and scope of my invention, I desire, therefore, that only such limitations shall be imposed as are indicated in the appended claims.

I claim as my invention:

1. In an alternating-current system, an alternating-current machine having an alternating-current winding and having excitation means for producing a first component of excitation and a second component of excitation in quadrature to said first component, means responsive to a condition dependent upon reactive current flow in said winding for varying said first component in such manner as to compensate for a magnetic effect produced by said reactive current flow.

2. In an alternating-current system, an alternating-current machine having an alternating-current winding, a main field winding for producing a main component of excitation and means for producing a second component of excitation in quadrature to said main component, and means responsive to a condition dependent upon active current flow in said alternating-current winding for varying said second component in such manner as to compensate for a magnetic effect produced by said active current flow.

3. In an alternating-current system, a polyphase synchronous machine having a polyphase alternating-current winding, a main field winding for producing a main component of excitation and means for producing a second component of excitation in quadrature to said main component, and means responsive to a condition dependent upon the active current flow in said polyphase winding for varying said second component in such manner as to compenate for the lag or lead of total excitation of said machine produced by said active current flow.

4. In an alternating-current system, a synchronous machine having an alternating-current winding, a main field winding for producing a main component of excitation, and means for producing a second component of excitation in quadrature to said main component, an electric circuit connected to said alternating-current winding, a regulator responsive to a voltage condition derived from said electric circuit for controlling said main component of excitation and means responsive to a condition dependent upon active current flow in said alternating-current winding for varying said second component in such manner as to compensate for a magnetic condition produced by said active current flow.

5. In a regulating system, an alternating-current machine having an alternating-current winding and having excitation means for producing a first component of excitation and a second component of excitation in quadrature to said first component, an electric circuit connected to said winding, means responsive to the reactive power flow in said circuit for varying said first component to neutralize the magnetic field produced by the reactive power flow in said winding, and means responsive to the real power flow in said circuit for varying said second component to neutralize the cross magnetic field produced by the real power flow in said winding.

6. In a regulating system, a synchronous alternating-current machine having a polyphase alternating-current winding and having direct current excitation means for producing a first component of excitation and a second component of excitation in quadrature to said first component, a polyphase electric circuit connected to said winding, means responsive to the reactive power flow in said circuit for varying said first component to compensate for the magnetic field produced by the reactive power flow in said winding and means responsive to the real power flow in said circuit for varying said second component to compensate for the cross-magnetic field produced by the real power flow in said winding.

7. In a regulating system, an alternating-current machine having a polyphase winding and having excitation means, a polyphase electric circuit connected to said winding, a regulating device comprising stator and rotor elements having polyphase windings of the same pole pitch for producing magnetic fields rotating in the same direction, means for energizing one of said windings of said device in accordance with the polyphase voltage of said circuit, means for energizing the other of said windings of said device in accordance with the polyphase current of said circuit and means controlled by said rotor for varying a component of excitation of said machine.

8. In a regulating system, an alternating-current machine having a polyphase winding and having a field winding, a polyphase electric circuit connected to said polyphase winding, a regulating device comprising stator and rotor elements having polyphase windings of the same pole pitch for producing magnetic fields rotating in the same direction, means for energizing one of said windings of said device in accordance with a polyphase voltage condition derived from said circuit, means for energizing the other of said windings of said device in accordance with a polyphase current condition derived from said circuit, means responsive to the torque produced by said rotor for varying the current in said field winding, and a torque device mechanically connected to said rotor, said torque device having windings responsive to the current in said field winding for exerting a torque in opposition to the torque produced by said rotor.

9. In a regulating system, an alternating current machine having a polyphase winding and having excitation means for producing a first component of excitation and a second component of excitation in quadrature to said first component, a first regulating device comprising stator and rotor elements having polyphase windings of the same pole pitch for producing magnetic fields rotating in the same direction, said windings of said first regulating device normally coinciding in angular position, a second regulating device comprising stator and rotor elements having polyphase windings of the same pole pitch for producing magnetic fields rotating in the same direction, said windings of said second regulating device normally being in quadrature, means for energizing one of said windings of each of said regulating devices in accordance with a polyphase voltage condition derived from said circuit, means for energizing the remaining winding of each of said regulating devices in accordance with a polyphase current condition derived from said circuit, means responsive to the torque of said first regulating device for varying said first component of excitation, and means responsive to the torque of said second regulating device for varying said second component of excitation.

CHARLES LE G. FORTESCUE.